UNITED STATES PATENT OFFICE.

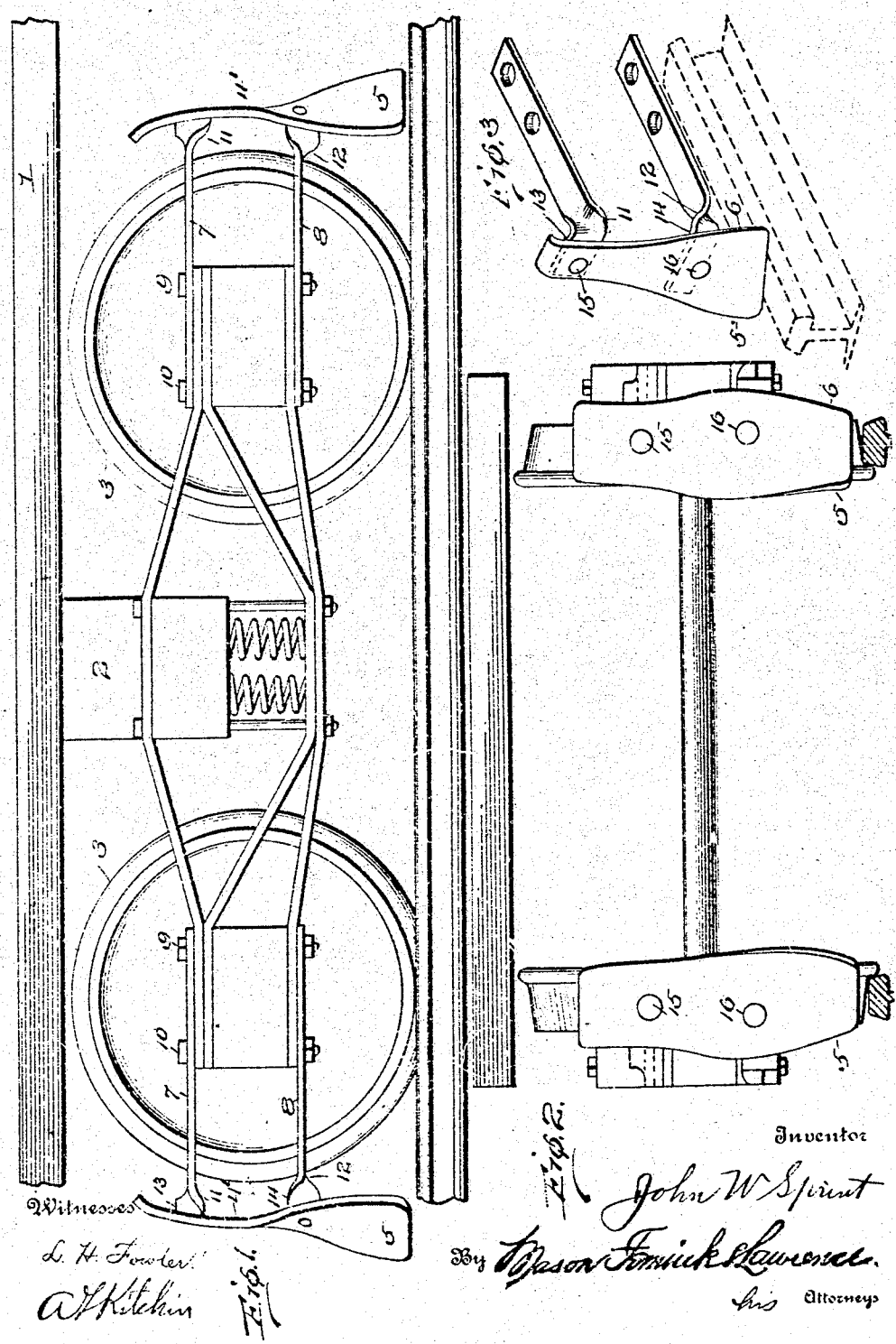

JOHN W. SPRINT, OF BOYCE, VIRGINIA, ASSIGNOR OF ONE-HALF TO JOSEPH A. DEWAR, OF MILLWOOD, VIRGINIA.

FENDER.

970,967.  Specification of Letters Patent.  Patented Sept. 20, 1910.

Application filed February 18, 1910. Serial No. 544,616.

*To all whom it may concern:*

Be it known that I, JOHN W. SPRINT, a citizen of the United States, residing at Boyce, in the county of Clarke and State of Virginia, have invented certain new and useful Improvements in Fenders; and I do hereby declare the following to be a full, clear, and exact description of the invention, such as will enable others skilled in the art to which it appertains to make and use the same.

This invention relates to improvements in guards or fenders located in the front of the wheels of cars, and has for an object the arrangement of an improved guard which will engage an object in front of the wheel and move the same to one side of the track as the car travels.

A further object of the invention is the arrangement of a guard for car wheels for forcing objects to one side of the track as the car moves along the track, said guard being rigidly supported on the trucks of the car so as to hold the guards at a predetermined height above the rails at all times.

With these and other objects in view the invention comprises certain novel constructions, combinations, and arrangement of parts as will be hereinafter more fully described and claimed.

In the accompanying drawings: Figure 1 is a side elevation of a truck and part of a car with my improved guard or fender secured thereto. Fig. 2 is an end view of the structure shown in Fig. 1. Fig. 3 is a detail perspective view of one of the fenders or guards and supporting bars embodying the invention.

Referring to the accompanying drawings, 1 indicates a car body of any desired character mounted upon truck 2 of any desired character, for the purpose of illustration an ordinary freight truck being shown. The truck 2 is provided with any desired number of wheels 3. In front and in the rear of each pair of wheels 3, respectively, are arranged fender blades 4', of identical construction so that the description of one will be sufficient for all of the blades.

It will be evident that where more than two sets of wheels are used on a truck, fenders need be supplied only for the outside or front and rear wheels. The fenders 4' are formed from a strip of sheet material twisted or bent at its lower end so as to have the lower edge set at an angle of about 45 degrees from the direction of the upper edge. This turning or twisting of the fender permits the fender to force any object with which it comes in contact off of the rail and laterally from the track. Preferably the lower part of the fender 4' is enlarged laterally at 5 and 6 so as to afford a larger surface for moving objects to one side, though in actual practice the same extends only a comparatively short distance on each side of the track. In order to properly support the fenders 4' and hold the same in front of the wheels and over the track at a predetermined height supporting bars 7 and 8 are provided which are secured in position by the bolts 9 and 10 of the truck. Bars 7 and 8 are preferably made of flat material and bent and twisted at points 11 and 12 so as to form offset portions 13 and 14 to which are secured by bolts or rivets 15 and 16 the fender 4'. The heads of the bolts or rivets 15 and 16 may be countersunk or not as preferred. By this construction and arrangement the fenders 4' are firmly held in position in front of the wheels, and by bolting or securing the bars 7 and 8 to the truck the fender remains always at the same height above the rail regardless of the load put upon car 1.

In arranging the fenders 4' it will be observed that each of the fenders is positioned at a slight angle to a vertical plane and has the lower end thereof slightly inclined forward. This is intended to cause the fender to not only be capable of moving an object laterally or transversely of the track, but to give a slightly scooping action for assisting the moving of the object from the track. By placing the guards 4' in position directly in front of each of the wheels of the truck means are provided for forcing any object on the track laterally therefrom regardless of the direction of movement of the truck.

It will be observed that the offset portions 13 and 14 extend for substantially the full width of the fenders 4' in order to provide means which will scrape or force the fender off the rail in case the same should become loosened and bent to pass under the wheels. The offset portion 14 of bar 8 is curved or bent so as to fit the shape or contour of the fender for more thoroughly bracing the same and for giving a lateral movement to the fender in case the fender should become dislocated. This will prevent any danger of derailing of the car by any accidental losing of any of the fenders as they will be immediately forced off the rail as soon as loosened from their supports.

What I claim is:

A fender for car wheels comprising a fender blade arranged in front of the car wheel and constructed of a blade of sheet metal extending transversely of the track at the top and twisted substantially for its entire length for causing the lower edge to set at an angle diagonally across the rail, a lower bar with one end rigidly secured to said fender blade and conforming to the contour thereof, said lower supporting bar being twisted and bent to extend in a general direction at right-angles to the end secured to said fender blade, an upper supporting bar secured to said fender and twisted so as to extend at a substantial right-angle thereto, said bars extending substantially parallel and being provided with apertures therein for accommodating the bolts of the truck of said car for rigidly securing the supporting bars to the truck of said car.

In testimony whereof I affix my signature in presence of two witnesses.

JOHN W. SPRINT.

Witnesses:
E. T. FENWICK,
JOHN L. FLETCHER.